US010432711B1

(12) United States Patent
Greenwood et al.

(10) Patent No.: US 10,432,711 B1
(45) Date of Patent: Oct. 1, 2019

(54) ADAPTIVE ENDPOINT SELECTION

(71) Applicant: Amazon Technologies, Inc., Reno, NV (US)

(72) Inventors: Christopher Magee Greenwood, Seattle, WA (US); James Michael Thompson, Seattle, WA (US); Kristina Kraemer Brenneman, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 432 days.

(21) Appl. No.: 14/486,894

(22) Filed: Sep. 15, 2014

(51) Int. Cl.
G06F 15/16 (2006.01)
H04L 29/08 (2006.01)
H04L 29/06 (2006.01)

(52) U.S. Cl.
CPC .......... H04L 67/1025 (2013.01); H04L 67/42 (2013.01)

(58) Field of Classification Search
CPC ............................ H04L 67/1025; H04L 67/42
USPC ........................................................ 709/203
See application file for complete search history.

(56) References Cited

U.S. PATENT DOCUMENTS

| 5,416,889 | A  | * | 5/1995  | Takahashi | G06F 17/5072 706/19 |
| 5,613,044 | A  | * | 3/1997  | Pechanek | G06N 3/063 706/25 |
| 6,665,271 | B1 | * | 12/2003 | Thomas | H04L 1/20 370/252 |
| 7,472,200 | B1 | * | 12/2008 | Taylor | H04L 45/00 709/227 |
| 7,626,994 | B2 | * | 12/2009 | Bennett | H04L 12/5692 370/419 |
| 7,636,917 | B2 | * | 12/2009 | Darling | H04L 29/06 709/223 |
| 7,734,024 | B1 | * | 6/2010  | Croak | H04M 15/00 379/112.01 |
| 7,822,849 | B2 | * | 10/2010 | Titus | H04L 29/06 709/224 |
| 8,037,186 | B2 | * | 10/2011 | Dumitriu | H04L 67/1029 709/226 |
| 8,489,529 | B2 | * | 7/2013  | Deng | G06N 3/0454 706/25 |
| 8,566,445 | B2 | * | 10/2013 | Maynard | G06F 9/505 709/225 |
| 8,683,075 | B1 | * | 3/2014  | Joffe | G06F 9/505 709/238 |
| 9,531,764 | B1 | * | 12/2016 | McHugh | H04L 67/142 |

(Continued)

Primary Examiner — Chris Parry
Assistant Examiner — Antony K Clayborn
(74) Attorney, Agent, or Firm — Klarquist Sparkman LLP

(57) ABSTRACT

A method for selecting a service endpoint from a plurality of service endpoints in a distributed system of a service provider may include storing processing data for each of the plurality of endpoints. A success rate may be calculated for each of the plurality of service endpoints and based on a number of processed requests from a plurality of received requests. An average latency may be calculated based on latency associated with each of the processed requests. A latency score may be calculated based on a minimum average latency and the average latency. A raw score may be calculated based on the latency score and the success rate. A selection weight may be calculated based on the raw score and a balancing parameter. One of the plurality of endpoints may be selected based on the selection weight.

20 Claims, 9 Drawing Sheets

(56) References Cited

U.S. PATENT DOCUMENTS

| | | | |
|---|---|---|---|
| 2002/0107962 A1* | 8/2002 | Richter | H04L 29/06 709/225 |
| 2002/0112082 A1* | 8/2002 | Ko | G06F 17/30899 709/246 |
| 2003/0021233 A1* | 1/2003 | Fabre | H04L 45/12 370/238.1 |
| 2004/0122903 A1* | 6/2004 | Saulpaugh | H04L 29/12009 709/206 |
| 2004/0190513 A1* | 9/2004 | Hakkarainen | H04L 12/18 370/389 |
| 2005/0144274 A1* | 6/2005 | Osborn | H04L 43/08 709/224 |
| 2006/0047742 A1* | 3/2006 | O'Neill | H04L 49/25 709/203 |
| 2006/0245706 A1* | 11/2006 | Kath | G02B 6/2713 385/123 |
| 2007/0097994 A1* | 5/2007 | Samdadiya | H04L 29/06027 370/401 |
| 2008/0059747 A1* | 3/2008 | Burckart | G06F 12/0253 711/167 |
| 2008/0263246 A1* | 10/2008 | Larson | G06F 13/372 710/107 |
| 2009/0006531 A1* | 1/2009 | Gillum | H04L 67/322 709/203 |
| 2009/0248693 A1* | 10/2009 | Sagar | G06F 17/30 |
| 2009/0300169 A1* | 12/2009 | Sagar | H04L 41/00 709/224 |
| 2010/0042711 A1* | 2/2010 | Hernandez | H04L 67/1002 709/223 |
| 2010/0067402 A1* | 3/2010 | Navarro | H04L 12/5691 370/254 |
| 2011/0170860 A1* | 7/2011 | Smith | H04J 3/0682 398/25 |
| 2011/0173323 A1* | 7/2011 | Fimbel | G08B 21/0423 709/224 |
| 2011/0225276 A1* | 9/2011 | Hamilton, II | G06F 9/5027 709/223 |
| 2011/0275365 A1* | 11/2011 | Fischer | H04W 76/10 455/423 |
| 2011/0295942 A1* | 12/2011 | Raghunath | H04L 45/00 709/203 |
| 2012/0054318 A1* | 3/2012 | Kim | G06F 9/5055 709/219 |
| 2012/0151068 A1* | 6/2012 | Su | H04L 43/0852 709/227 |
| 2012/0303775 A1* | 11/2012 | Gamaley | H04L 43/08 709/223 |
| 2013/0218814 A1* | 8/2013 | Kang | G06Q 10/00 706/12 |
| 2013/0238785 A1* | 9/2013 | Hawk | G06F 9/5072 709/224 |
| 2013/0254375 A1* | 9/2013 | Agiwal | H04L 43/0882 709/224 |
| 2013/0268653 A1* | 10/2013 | Deng | G06F 9/5044 709/224 |
| 2014/0215057 A1* | 7/2014 | Walsh | H04L 41/5009 709/224 |
| 2014/0215058 A1* | 7/2014 | Vicat-Blanc | H04L 43/045 709/224 |
| 2014/0379899 A1* | 12/2014 | Das | H04L 43/0876 709/224 |
| 2016/0065675 A1* | 3/2016 | Brand | G06F 17/30174 709/213 |

* cited by examiner

ADAPTIVE ENDPOINT SELECTION

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

With the increased use of cloud computing resources, some cloud computing environments (e.g., distributed system environments with a plurality of service endpoints) may be inefficient in managing resource allocation, such as selecting a destination endpoint from the plurality of service endpoints and managing the routing of service requests to the selected destination service endpoint for processing. More specifically, existing techniques for selecting a destination service endpoint may be inefficient and may lead to, for example, herding behavior where one (or several) of the available endpoints gets consistently selected for receiving and processing service requests.

BRIEF DESCRIPTION OF THE DRAWINGS

Various embodiments in accordance with the present disclosure will be described with reference to the drawings, in which.

DETAILED DESCRIPTION

Figure 1:
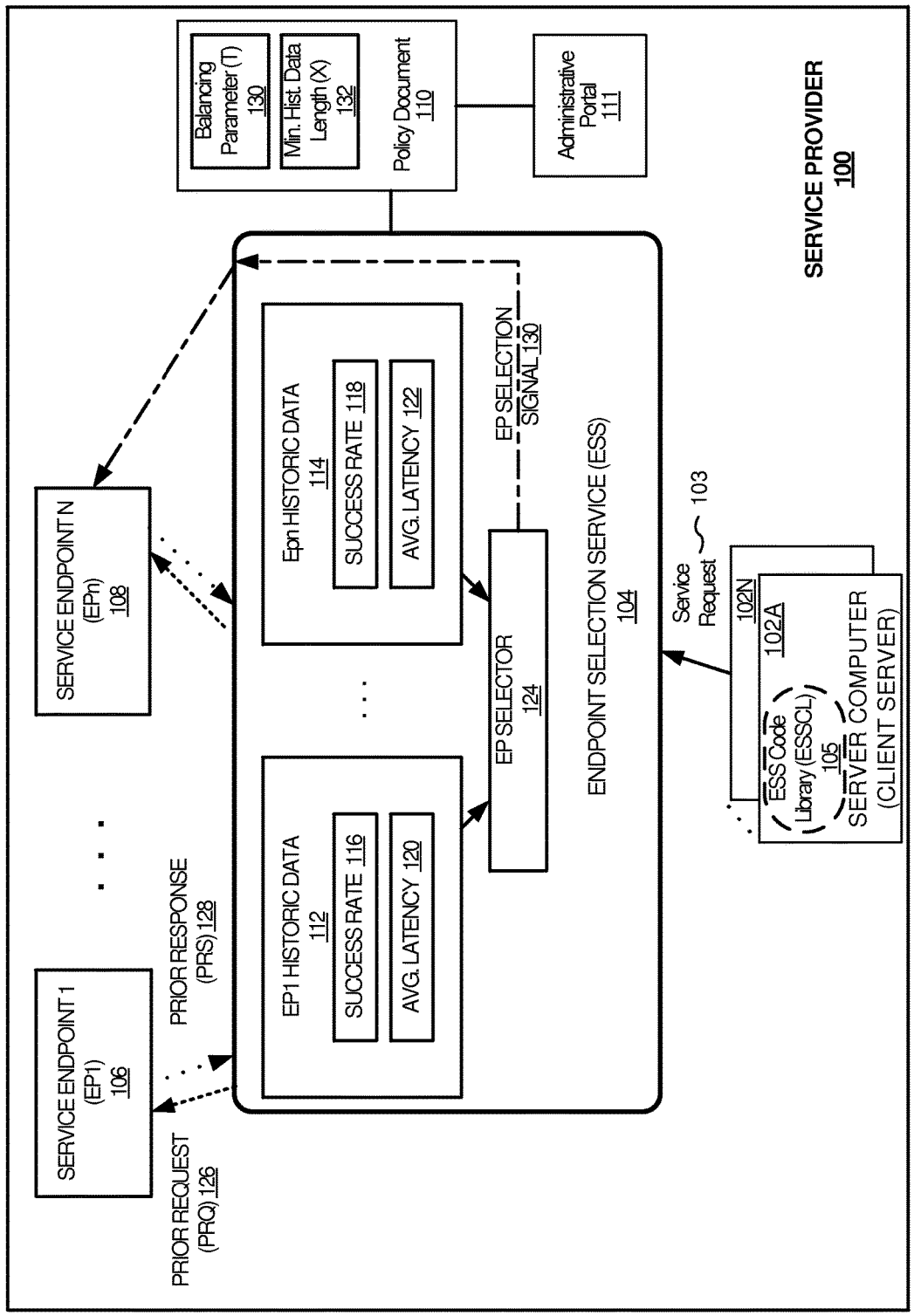
FIG. 1 is a diagram of an example network environment supporting service endpoint selection in a distributed system of a service provider, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment. As used herein, the terms "virtual machine" and "virtual machine instance" are interchangeable.

As used herein, the term "distributed system" refers to a computing system that includes a plurality of networked computers, where at least a portion of the computers are associated with performing a service (e.g., a plurality of servers that are service endpoints for a storage service). As used herein, the term "endpoint" or "service endpoint" is a network entity, processor or resource (e.g., a server) that can be referenced by a client server accessing, e.g., a Web service (or a network service, such as a database service or a storage service) associated with the endpoint. In this regard, one or more service requests for such service may be initiated by a host server (e.g., a client-side server) and may be addressed (or routed to) one or more of the service endpoints associated with the service.

It is common in distributed systems to have a client server make calls (or service requests) to one of a several service endpoints. Each call made by the client server is routed to an endpoint, and the call can either succeed with some latency or fail. Given sufficient running time, the service endpoints will transition between healthy and unhealthy states over time as, for example, hardware and software errors are introduced and remedied within the distributed system. The goal in selecting endpoints is to maximize the number of successful calls while not putting undue stress on any single service endpoint. Some implementations in distributed systems select uniformly from a plurality of available service endpoints. Other implementations perform endpoint selection using non-client entities, such as hardware load-balancers. While any of the service endpoints for a particular service are capable of receiving and processing requests for the particular service, the goal in selecting which service endpoint (or which service endpoints) to use for a given request can take into account, for example, past request processing history of various service endpoints in addition to other criteria in order to distribute the requests over the available service endpoints in an efficient manner.

The following description is directed to techniques and solutions supporting adaptive endpoint selection in a distributed system of a service provider. More specifically, historical processing data may be collected (and stored) for each of a plurality of service endpoints. The historic processing data may include an indication of a success or failure for each of a plurality of service requests communicated to the endpoint, as well as latency information associated with the successes or failures of processing such service requests. Selection weights may then be calculated for each service endpoint based on the historic processing data as well as a balancing parameter. The balancing parameter may be preset (e.g., pre-determined by a network administrator) and may be used to further scale one or more of the selection weights for endpoints that have better performance (e.g., higher rate of successful requests) or make the selection weights more uniform (i.e., by scaling down the impact of higher success rates or higher failure rates for purposes of selecting one or more of the service endpoints). In this regard, by changing the balancing parameter, adaptive endpoint selection may be performed using the calculated selection weights.

FIG. 1 is a diagram of an example network environment supporting service endpoint selection in a distributed system of a service provider, in accordance with an embodiment of the disclosure. Referring to FIG. 1, the service provider 100 (which is discussed in greater detail in reference to FIG. 4 below) may be a multi-tenant cloud network environment where one or more clients may run one or more virtual machine instances (VMIs) on one or more of server computers (e.g., 102A, . . . , 102N). The server computers may be, for example, client servers operated by (or on behalf of) one or more clients of the service provider 100. The service provider 100 may further comprise service endpoints EP1 (106), . . . , EPn (108), an endpoint selection service (ESS) 104, and a policy document 110 coupled to an administrative portal 111.

The endpoint selection service 104 may comprise suitable logic, circuitry, interfaces, and/or code and may be operable to perform endpoint selection-related functionalities within the service provider 100. For example, the ESS 104 may be configured to store historic processing data 112, . . . , 114 for the endpoints 106, . . . , 108, which may be used by the endpoint (EP) selector 124 to generate an EP selection signal 130 for selecting one of the endpoints 106, . . . , 108 for processing a current service request (e.g., 103).

The ESS 104 may also use a policy document 110, which may specify one or more policies in connection with endpoint selection functionalities. For example, the policy document 110 may specify a balancing parameter (T) 130 and a maximum historic data length (X) 132 (the use of the balancing parameter T and the historic data length X is explained herein below). The policy document 110 may be updated by, for example, an administrator via the administrative portal 111. The policy document 110 may also specify additional parameters (not illustrated in FIG. 1), such as a maximum number of endpoints used within the service endpoint set (EP1, EPn), an amount (duration) of time historic data (e.g., 112, . . . , 114) will be kept for each endpoint, and so forth.

In accordance with an example embodiment of the disclosure, the ESS may be implemented as a stand-alone service within the service provider 100 (as illustrated in FIG. 1) or it may be implemented as a code library (i.e., software) within one or more of the server computers 102A, . . . , 102N. For example, the server computer 102A may be a client server computer used by a client of the service provider 102A to access/run one or more services offered by the service provider 100 (e.g., services related to running one or more virtual machine instances on the server 102A, accessing storage services, database services, and so forth). In this regard, the server computer 102A may execute ESS code library 105, thereby implementing the ESS 104 on the server 102A.

In instances when the ESS 104 is a stand-alone service within the service provider 100, the ESS 104 may be used by any of the server computers 102A, . . . , 102N to select an endpoint for receiving and processing a service request. Even though FIG. 1 illustrates endpoints 106, . . . , 108, which are associated with the same service, other groups of endpoints (associated with one or more other services) may also be coupled to the ESS 104 so that the ESS 104 can perform endpoint selection for each of the additional services as well.

In operation, a service request 103 (e.g., for accessing a storage service associated with service endpoints 106, . . . , 108) may be communicated by the server computer 102A to the ESS 104. The ESS 104 may determine that the service request 103 is for a service associated with endpoints 106, . . . , 108, and may then access historic processing data profiles 112, . . . , 114 associated with endpoints 106, . . . , 108, respectively. Each of the historic processing data profiles 112, . . . , 114 may provide information related to processing of prior service requests by the respective endpoint, such as success rate information 116, . . . , 118 and average latency information 120, . . . , 122 for endpoints 106, . . . , 108, respectively. In instances when the ESS code library is implemented within one or more of the server computers 102A, . . . , 102N, a service request (e.g., 103) may be used within the server computer and it will not be communicated outside of the respective server computer.

Figure 2:
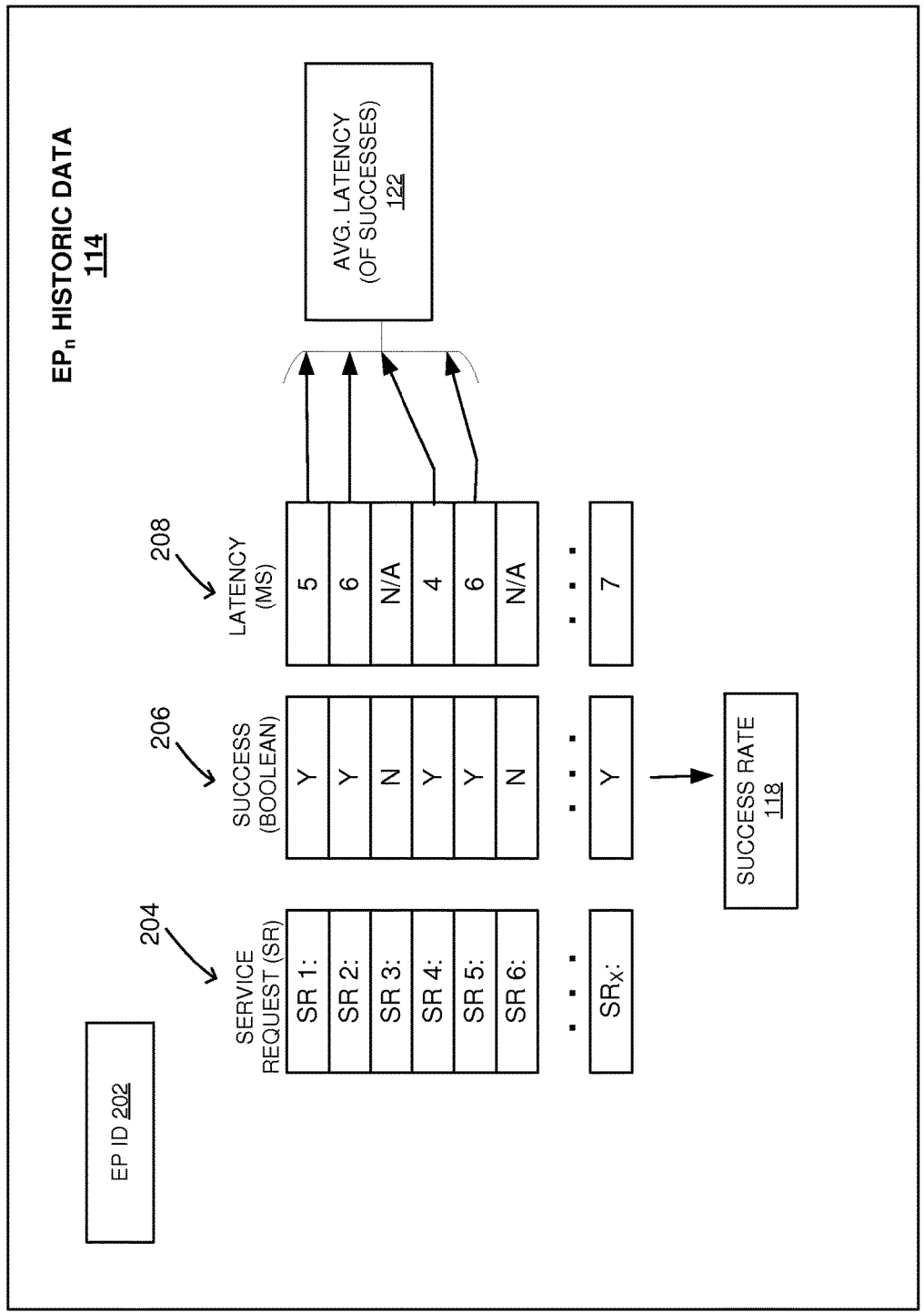
FIG. 2 is a block diagram of an example endpoint historic data profile, in accordance with an embodiment of the disclosure.

FIG. 2 is a block diagram of an example endpoint historic data profile, in accordance with an embodiment of the disclosure. Referring to FIG. 2, there is illustrated a more detailed diagram of the historic data profile 114 for EPn 108. More specifically, the historic processing data profile 114 may include an endpoint identification information 202, a list 204 of prior service requests, success information 206, and latency information 208. The identification information 202 may be simply an identifier that can be used by the ESS 104 to locate the historic data profile 114. The list 204 includes all prior service requests (SR1, SRx) that have been received and processed (either successfully or not) by the EPn 108. The success data 206 may include a Boolean value for each of the SRs in list 204, indicating that the particular service request was processed successfully (e.g., Boolean value of Y or YES) or that the service request has failed (e.g., Boolean value of N or NO). The latency information 208 may indicate a latency value (e.g., in milliseconds) for a successful or failed service request. The latency time may include a total time from the moment the request is received by the endpoint, the time it took to process it and send back a notification of the processing (or in case of failure, the notification of the failed request).

The list 204 of prior service requests may be continuously updated (i.e., a "running list"), so that processing result from the most recent service request may be added after the request has been processed. A historical data length (X) 132 may be a parameter stored within the policy document 110 and may indicate the number of service requests that may be kept in the list 204. In this regard, the list 204 may be updated with new request data, however, once the list 204 reaches the maximum length X, then once a new record is added, the oldest record from the list may be dropped off (or deleted). Accordingly, success rate 116, . . . , 118 and average latency 120, . . . , 122 may be updated every time the list 204 is updated.

The success rate 118 may then be calculated based on the number of successfully processed service requests and the total number of requests (e.g., a success rate will be 40% or 0.4 if there are 40 successfully processed requests out of a total of 100 service requests). The average latency (of successes) 122 can be calculated based on the latency value for all successfully processed requests (as indicated in FIG. 2).

The historic processing data 112, . . . , 114, including the corresponding success rates 116, . . . , 118 and average latencies (for success) 120, . . . , 122 may be used by the endpoint selector 124 within the ESS 104 to determine which of the service endpoints 106, . . . , 108 will be selected for processing the service request 103. For example, the EP selector 124 may be operable to calculate a plurality of scores, including a selection weight, for each of the endpoints 106, . . . , 108 based on the corresponding success rates 116, . . . , 118, the average latencies 120, . . . , 122, and a balancing parameter (T) 130 (which may be stored as part of the policy document 110). In an example implementation, the balancing parameter 130 may be used to further scale the selection weights for endpoints that have better performance (e.g., higher success rates) or make the selection weights more uniform (i.e., by disregarding higher success rates or higher failure rates for one or more of the service endpoints), which would result in a more uniform selection from the plurality of endpoints 106, . . . , 108.

In some instances, the calculation of the selection weights may be based on a Boltzmann distribution, which may be expressed by the following equation: $F(state) \propto e^{-E/kT}$, where F is relative probability of a state, E is a measure of the state's energy, k is an integer, and T is the balancing parameter 130. After the selection weights have been calculated, the EP selector 124 may use a random weighted distribution scheme based on the selection weights to select one of the endpoints 106, . . . , 108 to receive and process the service request 103.

The following is a sample calculation of selection weights for two endpoints—EP1 and EP2. Each of the two endpoints has historic processing data based on 100 previously received requests (i.e., the historical data length is 100 for both endpoints).

EP1: Success rate=90/100=0.9 or 90% (processed 90 service requests successfully from a total of 100 received). Average latency of successes=5 ms. Average latency of failures=1 ms.

EP2: Success rate=70/100=0.7 or 70% (processed 70 service requests successfully from a total of 100 received). Average latency of successes=10 ms. Average latency of failures=2 ms.

The following scores may then be calculated:

A minimum average latency: min_avg_latency=5 ms (this is the minimum latency of successes from all endpoints; in this case, it is the average latency of successes for EP1).

The latency score for EP1: EP1_latency_score=min_avg_latency/EP1_avg_successful_latency=5 ms/5 ms=1.0.

The latency score for EP2: EP2_latency_score=min_avg_latency/EP2_avg_successful_latency=5 ms/10 ms=0.5.

The success score for EP1 (same as the success rate): EP1_success_score=0.9.

The success score for EP2: EP2_success_score=0.7.

A raw score for EP1 (based on the latency score and the success score): EP1_raw_score=EP1_latency_score*EP1_success_score=1.0*0.9=0.9.

A raw score for EP2: EP2_raw_score=EP2_latency_score*EP2_success_score=0.5*0.7=0.35.

The balancing parameter (T) 130 may be selected as a decimal value from a range, for example, 0.1-1.0 based on whether exploration of uniform use of the plurality of service endpoints is desired (i.e., disregarding prior history of successes and overly selecting primarily endpoints with higher success rates), or whether exploitation of the known processing data is desired (i.e., exploitation of any knowledge indicating that one or more endpoints have a higher success rate than others and should therefore be selected more often). The selection of the balancing parameter 130 as a decimal value in the lower part of the range (i.e., values close to 0.1) will result in exploitation of the known processing data, and values close to the upper part of the range (i.e., values close to 1.0) will result in exploration of uniform use of all endpoints, regardless of prior history of higher success rates. The selection of the balancing parameter T 130 may be done be a developer or network administrator, and may be stored as part of the policy document 110 (e.g., as part of a service profile for all endpoints associated with a given service offered by the service provider). The range of 0.1-1.0 for T specified above is an example range and other ranges may be used as well based on a specific implementation.

For a balancing parameter T=0.1, the following selection weights are calculated:

EP1_selection_weight=$e$^(EP1_raw_score/T)=$e$^(0.9/0.1)=8103.08.

EP2_selection_weight=$e$^(EP2_raw_score/T)=$e$^(0.35/0.1)=33.1155.

For a balancing parameter T=1.0, the following selection weights are calculated:

EP1_selection_weight=$e$^(EP1_raw_score/T)=$e$^(0.9/1.0)=2.4596.

EP2_selection_weight=$e$^(EP2_raw_score/T)=$e$^(0.35/1.0)=1.419.

As seen, for T=0.1, the selection weight for EP1 (the endpoint with higher success rate) is significantly higher than the selection weight for EP2, which will result in exploitation of the known processing data (i.e., EP1 will be selected more often for processing requests). For T=1.0, the selection weights are more uniform and similar, which will result in exploitation of uniform use of the endpoints (i.e., EP1 and EP2 will be more uniformly selected for processing requests). In this regard, by changing the value of the balancing parameter (T) 130, adaptive selection of endpoints may be performed based on the balancing parameter value.

After performing the above calculations (e.g., by the EP selector 124 within the ESS 104), the selection weights for each endpoint 106, . . . , 108 may be used in a uniform weighted distribution scheme to select an endpoint. The endpoint selection signal 130 is generated for selecting one of the endpoints (in FIG. 1, EPn 108 is selected for processing the service request 103).

In an example implementation, the balancing parameter 130 may be automatically adjusted to account for, e.g., herding behavior and bottleneck situations associated with a plurality of endpoints. For example, network traffic and endpoint congestion may be measured and the balancing parameter may be adjusted accordingly, in real time.

Figure 3:
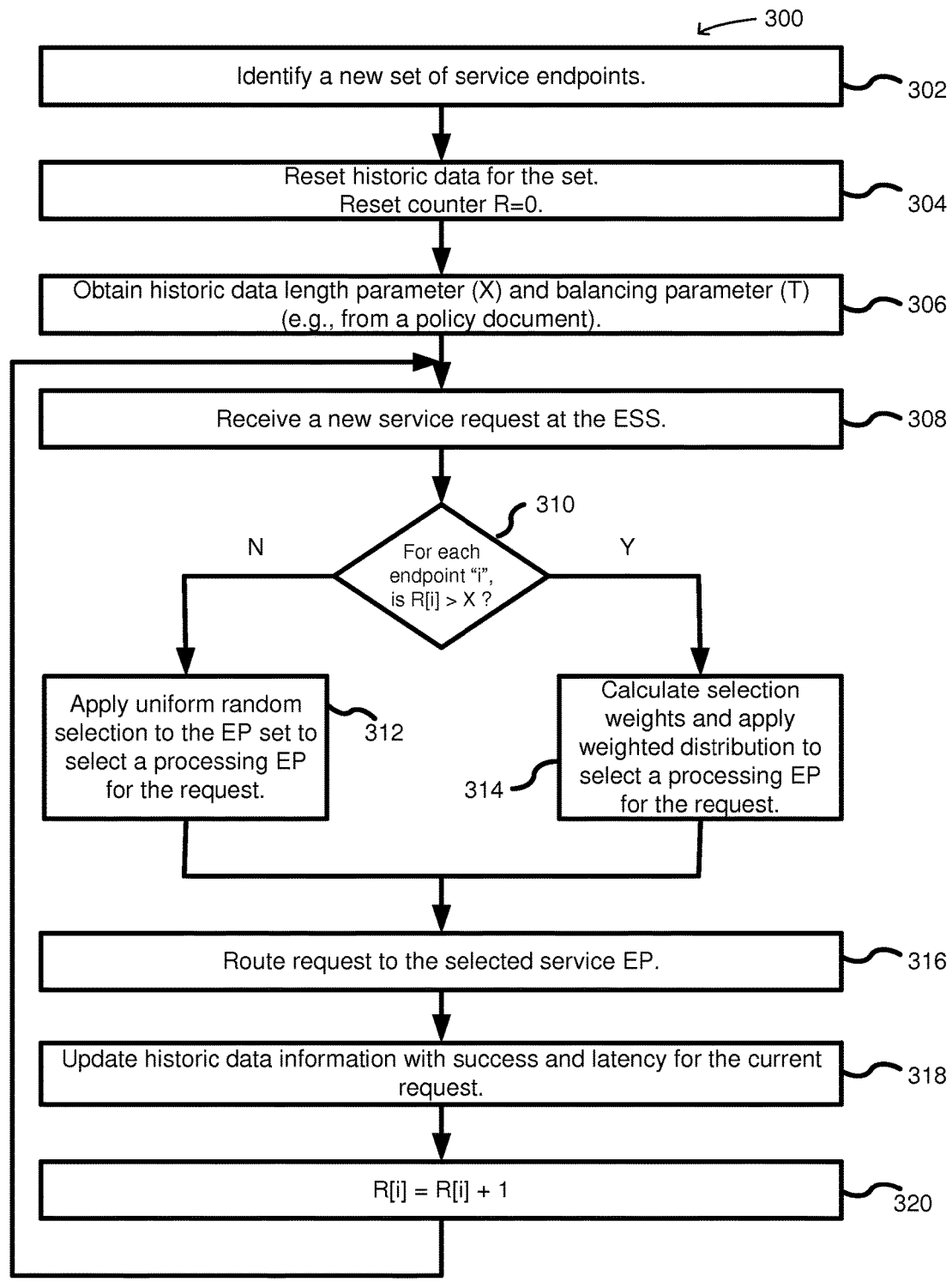
FIG. 3 is a flowchart of example method of selecting endpoints based on availability of endpoint historic data, in accordance with an embodiment of the disclosure.

FIG. 3 is a flowchart of example method of selecting endpoints based on availability of endpoint historic data, in accordance with an embodiment of the disclosure. Referring to FIGS. 1-3, the example method 300 may be performed in instances when a new set of endpoints is launched and there is insufficient historic data available for triggering the adaptive endpoint selection (e.g., as described above). Put another way, the historic data length associated with the endpoints is smaller than the minimum historic data length parameter (X) 132 stored in the policy document 110.

At 302, a new set of service endpoints (e.g., 106, . . . , 108) may be identified by the service provider 100 (e.g., a current set of endpoints may change when a new endpoint is added). At 304, The historic data profiles (112, . . . , 114) for each endpoint may be reset. A counter R of the current historic data length (i.e., a counter of how many service requests have been processed) may be reset (i.e., R=0). At 306, the minimum historic data length parameter (X) 132 and the balancing parameter (T) 130 may be obtained from the policy document 110.

At 308, a new service request (e.g., 103) may be received at the ESS 104. At 310, it may be determined for each endpoint "i" (e.g., by the EP selector 124), whether the counter R[i] of the current historic data for endpoint "i" (i.e., the current number of processed requests) is greater than the minimum number of historic data length (X) 132 for each endpoint. If R[i] is not greater than X, then processing may continue at 312 when a uniform random selection may be applies to the current endpoint set 106, . . . , 108 so that an endpoint may be selected. If R[i]>X then processing may continue at 314 when selection weights may be calculated based on the balancing parameter (T) 130 (e.g., as described above). A uniform weighted distribution may then be applied using the calculated selection weights to select an endpoint from the set of endpoints 106, . . . , 108 for servicing the request 103.

At 316, the service request 103 may be routed to the selected endpoint. At 318, the historic data information for the selected endpoint may be updated (e.g., the new service request may be logged in the historic data profile, with its corresponding success (Boolean) value and latency information (as seen in FIG. 2)). At 320, the current historic data length counter R[i] for endpoint "i" may be incremented, and processing may resume at 308 with the receipt of a subsequent service request.

Figure 4:
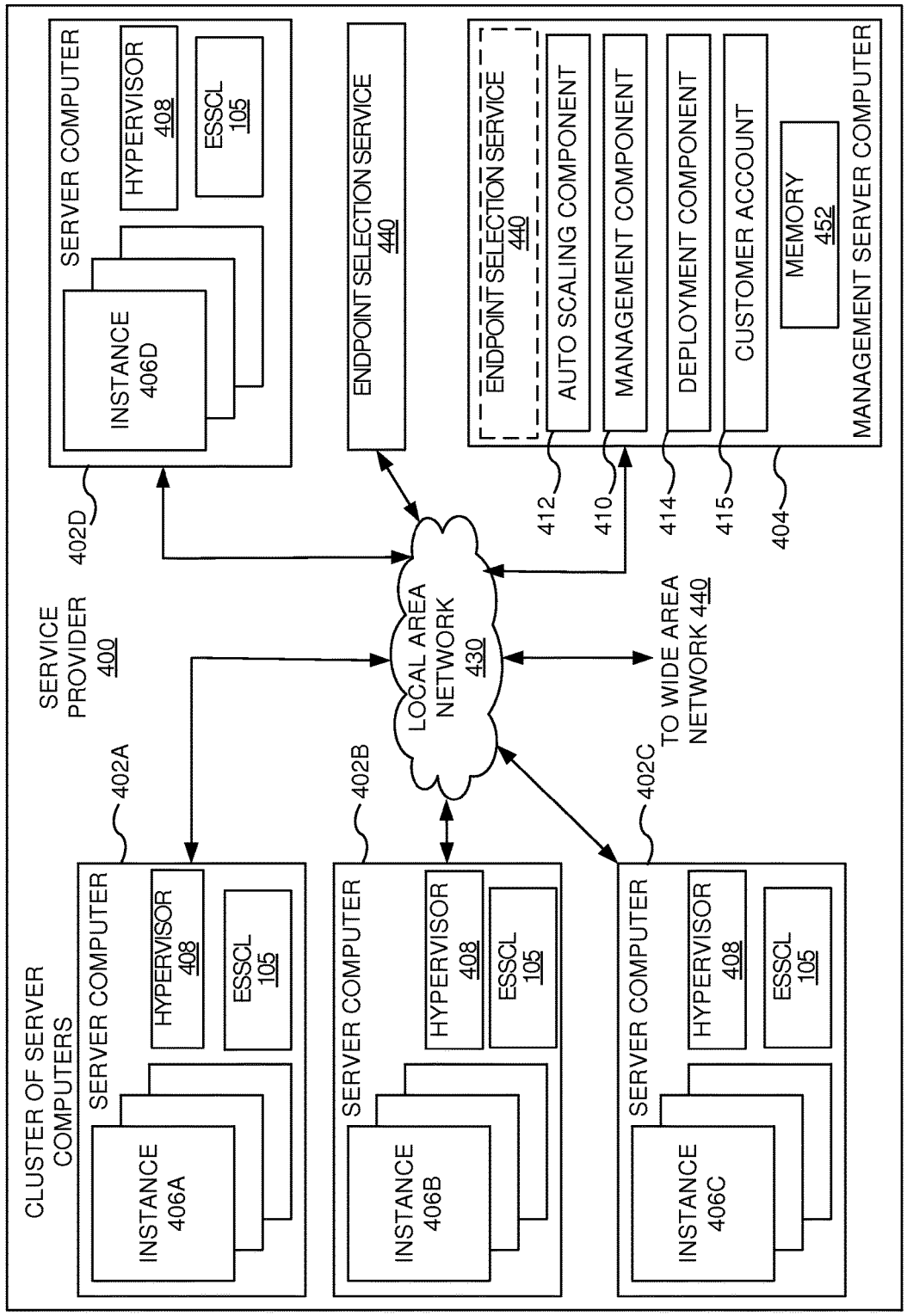
FIG. 4 is an example system diagram showing a plurality of virtual machine instances running in a multi-tenant environment, using an endpoint selection service code library, in accordance with an example embodiment of the disclosure.

FIG. 4 is an example system diagram showing a plurality of virtual machine instances running in a multi-tenant environment, using an endpoint selection service code library, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 100 illustrated in FIGS. 1-3.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large data centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise endpoint selection service code library (ESSCL) 105, which may be used by one or more of the instances 406 to run code (i.e., software) implementing an endpoint selection service, such as ESS 104, as illustrated in FIGS. 1-3.

Figure 5:
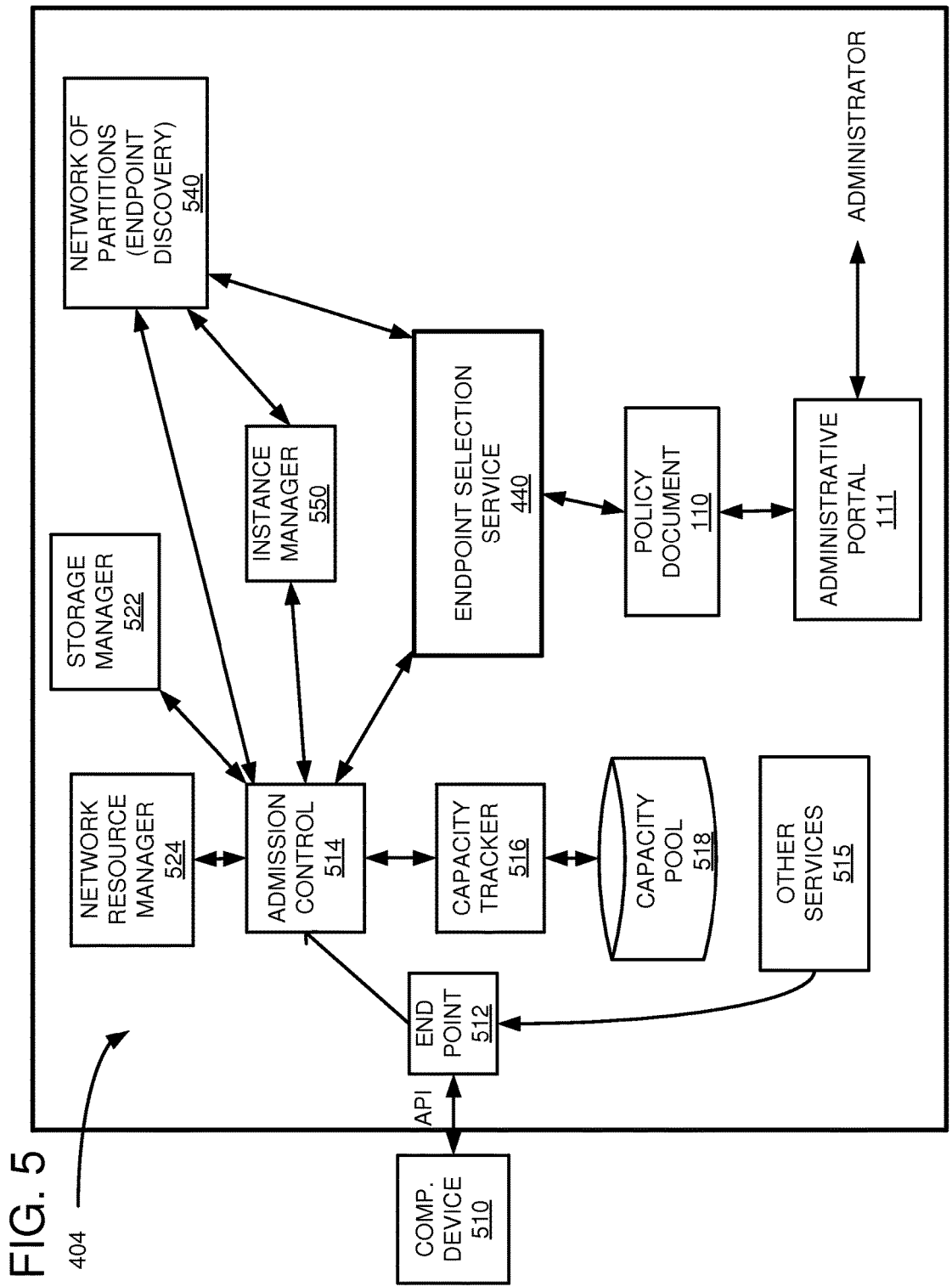
FIG. 5 shows further details of an example system including a plurality of management components associated with a control plane, which may be used to provide endpoint selection according to one embodiment.

The service provider 400 may also comprise an endpoint selection service 440, which may have the functionalities described herein in connection with the ESS 104. The endpoint selection service 440 may be implemented as a stand-alone service within the provider 400, as a dedicated server (similar to the servers 402A-402D), as a code library within one or more of the servers 402 (e.g., ESSCL 105), and/or may be implemented as part of the server computer 404 that performs management functions. For example, the endpoint selection service 440 may be implemented as part of the management component 410 (as seen in FIG. 5). In an example embodiment, the ESSCL 105 may be implemented within one or more of the instances 406 running on a respective server computer.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the endpoint selection service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the endpoint selection service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to provide endpoint selection according to one embodiment. More specifically, FIG. 5 illustrates in further detail the management component 410, which may implement the endpoint selection service 440 within the multi-tenant environment of the service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein or to access one or more services provided by the service provider 400. Other services 515, which can be internal to the service provider 400, can likewise make API requests to the end point 512. The API requests from the client can pass through the admission control 514 and onto the endpoint selection service 440 in order to access endpoint selection-related functionalities of the service provider 400.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The endpoint selection service 440 may perform the endpoint selection functionalities described herein (e.g., the functionalities described in reference to ESS 104). The ESS 440 may communicate with the admission control 514 (e.g., to receive new service requests), with the network of partitions 540 (to select one or more endpoints from a set of available endpoints), and the policy document 110 (e.g., as described in connection with FIG. 1).

Figure 6:
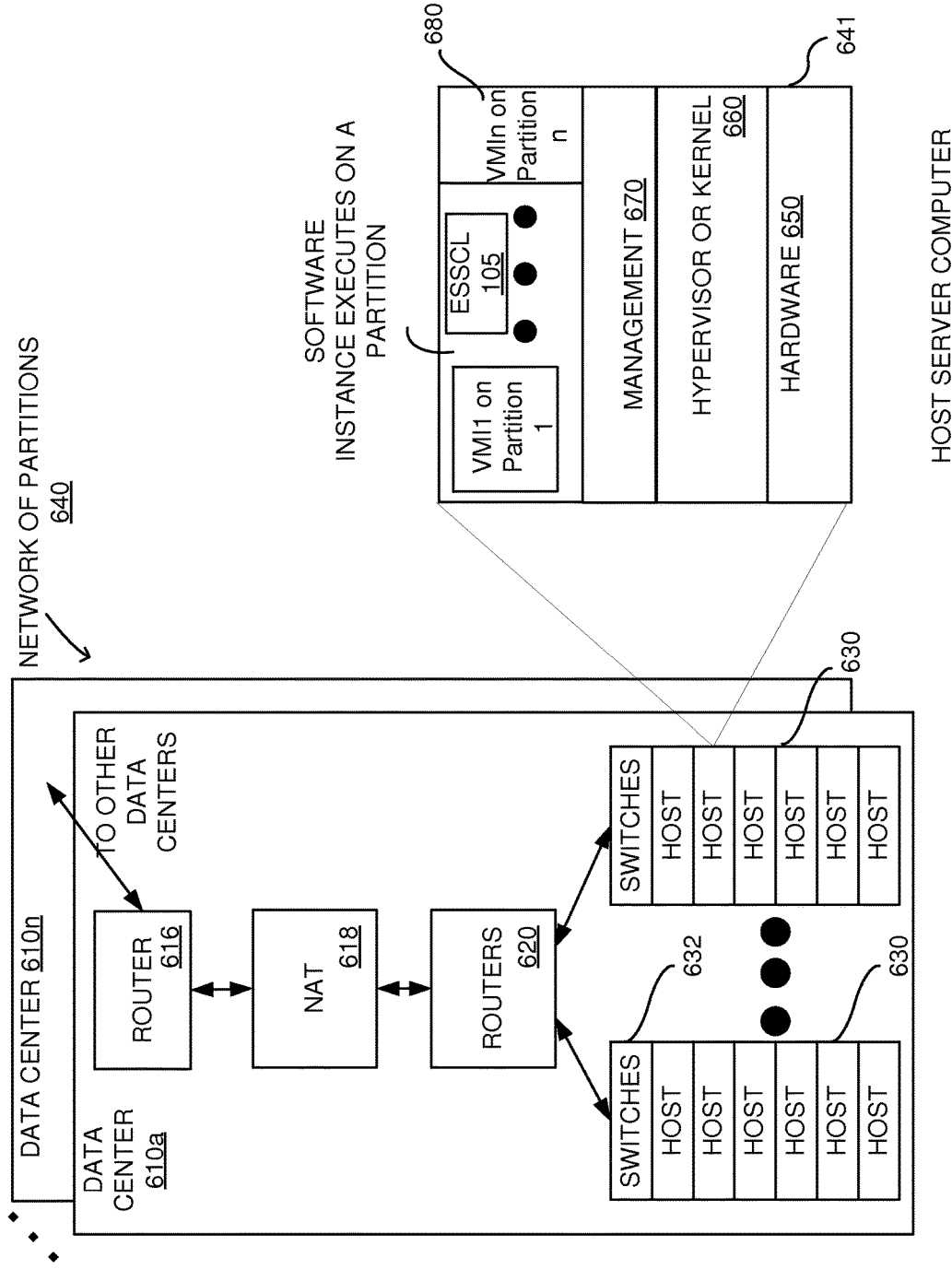
FIG. 6 shows an example of a plurality of host computers, routers, and switches—which are hardware assets used for running virtual machine instances—with the host computers having service endpoint selection-related functionalities that may be configured according to one embodiment.

FIG. 6 shows an example of a plurality of host computers, routers, and switches—which are hardware assets used for running virtual machine instances—with the host computers having service endpoint selection-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610*a*. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650. Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. In an example embodiment, the hypervisor layer 660 may include the DFS software 409, which may be used to install DSNs or DMNs, as described herein.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions. One or more of the VMIs (VMI1, VMIn) on partitions 680 may also execute the enspoint selection service code library 105 for performing adaptive endpoint selection functionalities, as described herein. The ESSCL 105 may be running on one or more of the VMIs running on partitions 680.

Figure 7:
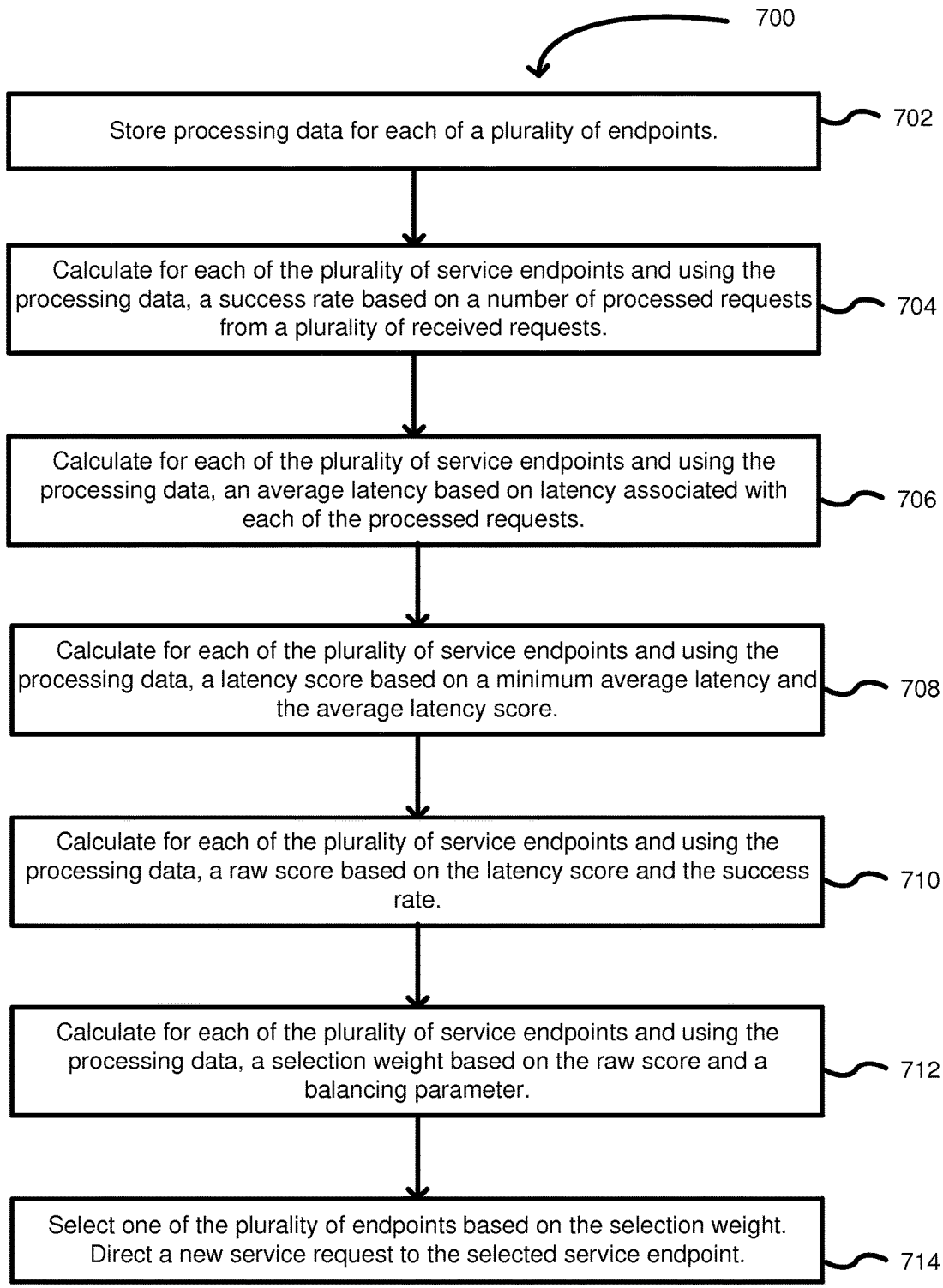
FIGS. 7-8 are flowcharts of example methods of providing service endpoint selection in a distributed system of a service provider, in accordance with an embodiment of the disclosure.
Figure 8:
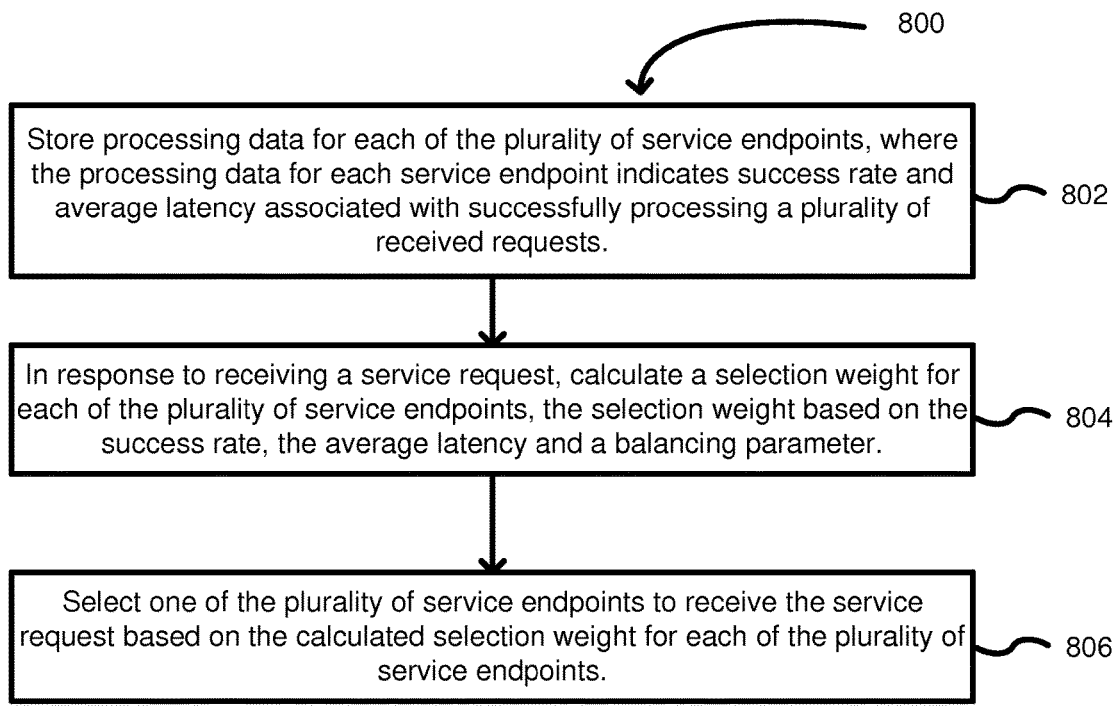

FIGS. 7-8 are flowcharts of example methods of providing service endpoint selection in a distributed system of a service provider, in accordance with an embodiment of the disclosure. Referring to FIGS. 1, 2, and 7, the example method 700 may start at 702, when processing data for each of a plurality of service endpoints may be stored. For example, the ESS 104 may store historic processing data 112, . . . , 114 for service endpoints 106, . . . , 108, respectively. At 704, the ESS 104 may perform a plurality of calculations based on the historic processing data 112, . . . , 114. For example, the ESS 104 (e.g., the EP selector 124) may calculate a success rate (e.g., 116, . . . , 118) based on a number of processed requests (e.g., a number of successfully processed requests, as seen in FIG. 2) from a plurality of received requests. At 706, the ESS 104 may calculate an average latency (e.g., 120, . . . , 122) based on latency associated with each of the successfully processed requests. At 708, the ESS 104 may calculate a latency score based on a minimum average latency (e.g., a minimum latency selected from the available set of endpoints) and the average latency score. For example, the minimum average latency may be selected from the average latency score for each of the plurality of endpoints 106, . . . , 108. At 710, the ESS 104 may calculate a raw score based on the latency score and the success rate (e.g., the raw score may be a product of the latency score and the success rate). At 712, the ESS 104 may calculate a selection weight for each of the service endpoints, based on the raw score and a balancing parameter (e.g., balancing parameter T 130). The balancing parameter may determine an impact of the success rate on the selection weight (a sample calculation of the above scores is provided in the description of FIG. 1). At 714, the EP selector 124 may generate an EP selection signal 130 and one of the plurality of endpoints may be selected based on the selection weight (e.g., as used in an example random weighted distribution selection scheme). A new service request may then be directed to the selected service endpoint.

The calculating of the selection weights may be performed using a Boltzmann distribution. The Boltzmann distribution may be expressed as is expressed as $F(state) \propto e^{-E/kT}$, where F is relative probability of a state, E is a measure of the state's energy, k is an integer, and T is the balancing parameter 130. The balancing parameter T may be used to emphasize exploitation of the processing data versus exploration of uniform use of the plurality of service endpoints. For example, a relatively lower value of the balancing parameter 130 may emphasize the exploitation of the processing data, and a relatively higher value of the balancing parameter 130 may emphasize the exploration of uniform use of the plurality of service endpoints.

Referring to FIGS. 1, 2, and 8, the example method 800 may start at 802, when the ESS 104 may store processing data (e.g., historic processing data 112, . . . , 114) for each of a plurality of service endpoints (e.g., 106, . . . , 108). The processing data for each service endpoint may indicate success rate (e.g., 116, . . . , 118) and average latency (e.g., 120, . . . , 122) associated with successfully processing a plurality of received requests. At 804, in response to receiving a service request (e.g., 103), the ESS 104 may calculate a selection weight for each of the plurality of service endpoints (e.g., as explained above in reference to FIG. 1). The selection weight may be based on the success rate (116, . . . , 118), the average latency (120, . . . , 122) and a balancing parameter (e.g., 130). The balancing parameter 130 may indicate exploitation of the processing data versus exploration of uniform use of the plurality of service endpoints during endpoint selection (e.g., as explained above in reference to FIGS. 1-2). At 806, the ESS 104 may select one of the plurality of service endpoints to receive the service request based on the calculated selection weight for each of the plurality of service endpoints.

Figure 9:
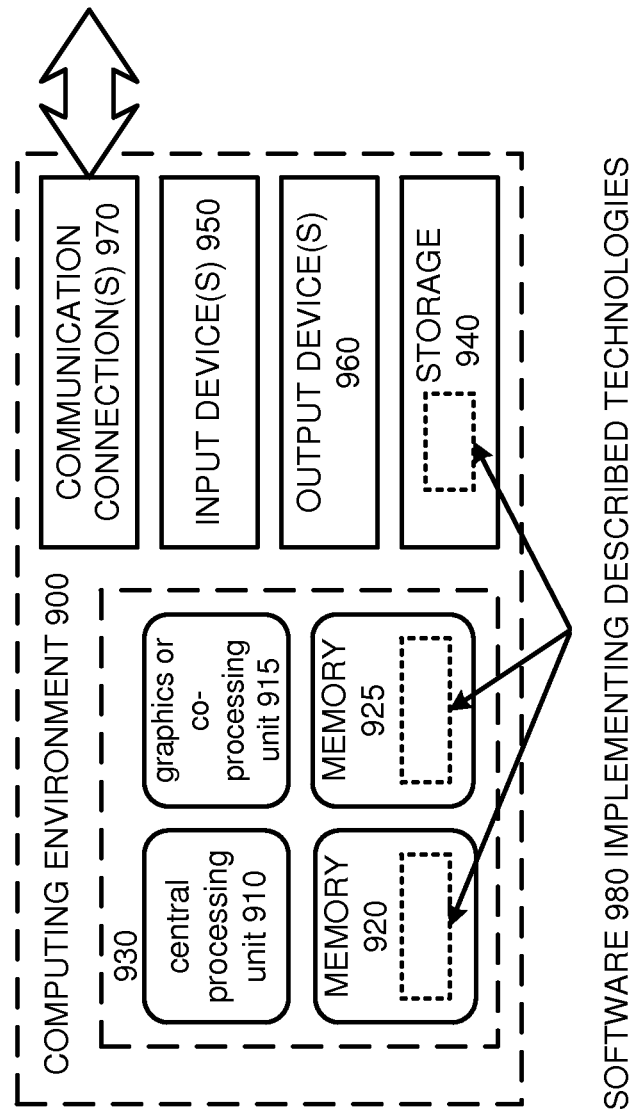
FIG. 9 depicts a generalized example of a suitable computing environment in which the described innovations may be implemented.

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for selecting, for a client device, a service endpoint from a plurality of service endpoints in a distributed system of a service provider, the method comprising:

storing processing data for each of the plurality of service endpoints, for at least a first service request from the client device, where a current history length is less than or equal to a threshold length, applying uniform random selection to select a first one of the plurality of service endpoints;

for at least a second service request from the client device, where the current history length for all of the plurality of service endpoints exceeds the threshold length:

calculating for each of the plurality of service endpoints and using the processing data:

a success rate based on a number of successfully processed requests from a plurality of received requests, wherein the success rate indicates a rate of success for the plurality of received requests;

an average latency based on latency associated with each of the successfully processed requests;

a latency score based on a minimum average latency and the average latency, wherein the minimum average latency is selected from the average latency for each of the plurality of service endpoints;

a raw score based on the latency score and the success rate; and a selection weight based on the raw score and a balancing parameter, wherein the balancing parameter determines an extent to which the selection weight deviates, based on the processing data, from uniform weights across the plurality of service endpoints; and selecting a second one of the plurality of service endpoints based on the selection weight; and directing the first and second service requests to the first and second selected service endpoints respectively.

2. The method according to claim 1, wherein the processing data comprises historic latency data and historic successful request data.

3. The method according to claim 1, wherein calculating the selection weight is performed using a Boltzmann distribution, wherein the Boltzman constant $k_B$ is replaced by an integer k.

4. The method according to claim 3, wherein the Boltzmann distribution is expressed as $$F(\text{state}) \propto e^{-\frac{E}{kT}},$$

where F is a relative probability of a state, E is a measure of the state's energy, k is an integer, and T is the balancing parameter.

5. The method of claim 1, wherein the plurality of service endpoints are servers associated with a Web service, a database service, or a storage service, and wherein the success rate of a given service endpoint indicates the rate of success for Web service requests, database service requests, or storage service requests received and processed at the given service endpoint.

6. The method according to claim 1, wherein:

a relatively lower value of the balancing parameter emphasizes exploitation of the processing data; and a relatively higher value of the balancing parameter emphasizes exploration of uniform use of the plurality of service endpoints.

7. The method according to claim 1, comprising:

selecting the second one of the plurality of service endpoints based on a random weighted distribution scheme using the selection weight for each of the plurality of service endpoints.

8. A computer-readable storage medium having instructions thereon for executing a method for selecting a service endpoint from a plurality of service endpoints in a distributed system of a compute service provider, the method comprising:

using an endpoint selection service of the compute service provider:

in a first case with an endpoint historic data length parameter of a given endpoint greater than a counter of a current historic length of the given endpoint, applying uniform random endpoint selection to select a first service endpoint; and in a second case with the endpoint historic data length parameter of the given endpoint less than the counter of the current historic length of the given endpoint:

storing processing data for each of the plurality of service endpoints, wherein the processing data for each service endpoint indicates a success rate and an average latency associated with successfully processed requests from a plurality of received requests, wherein the success rate indicates a rate of success for the plurality of received requests;

in response to receiving a service request, calculating a selection weight for each of the plurality of service endpoints, the selection weight based on the success rate, the average latency and a balancing parameter, the balancing parameter indicating an extent to which the selection weight deviates, based on the processing data, from uniform weights across the plurality of service endpoints; and selecting a second one of the plurality of service endpoints to receive the service request based on the calculated selection weight for each of the plurality of service endpoints.

9. The computer-readable storage medium according to claim 8, wherein the processing data for each service endpoint comprises:

an endpoint identifier of the service endpoint;

for each of the plurality of received requests, a Boolean value indicating whether the received request was successfully processed; and for each of the plurality of received requests that was successfully processed, a latency value, wherein the latency value indicates time duration from receiving the request at the service endpoint, processing the request, and communicating a reply from the service endpoint indicating the request was successfully processed.

10. The computer-readable storage medium according to claim 8, wherein the method further comprises:

resetting a historic data profile for each of the plurality of service endpoints, the historic data profile for storing the processing data.

11. The computer-readable storage medium according to claim 8, wherein the method further comprises:

in response to receiving the service request, determining for each of the plurality of service endpoints, whether the processing data includes success rate data and average latency data associated with at least a minimum number of received requests.

12. The computer-readable storage medium according to claim 11, wherein the method further comprises, in a third case for which the processing data includes success rate data and average latency data associated with a number of received requests that is lower than the minimum number:

selecting one of the plurality of service endpoints to receive the service request based on a uniform random selection from the plurality of service endpoints.

13. The computer-readable storage medium according to claim 11, wherein the method further comprises, in a fourth case for which the processing data includes success rate data and average latency data associated with a number of received requests that is higher than or equal to the minimum number:
  selecting one of the plurality of service endpoints to receive the service request based on the calculated selection weight for each of the plurality of service endpoints.

14. The computer-readable storage medium according to claim 8, wherein the method further comprises:
  for each service endpoint of the plurality of service endpoints, acquiring the balancing parameter from a policy document associated with the service endpoint.

15. The computer-readable storage medium according to claim 8, wherein the method further comprises:
  updating success data within the processing data based on whether the received service request was processed successfully.

16. The computer-readable storage medium according to claim 15, wherein the method further comprises:
  if the received service request was processed successfully, updating latency data within the processing data based on latency associated with processing the received service request.

17. A system for selecting a service endpoint from a plurality of service endpoints in a distributed system of a compute service provider, the system comprising:
  a plurality of host server computers coupled together through a network to form the service provider, at least a portion of the host server computers for executing a plurality of virtual machine instances associated with a customer account;
  the plurality of service endpoints operable to execute at least one of a plurality of service requests associated with a service of the service provider, the service requests originating from at least one of the host server computers; and
  an endpoint selection service communicatively coupled to the plurality of service endpoints, the endpoint selection service operable to:
    store processing data for each of the plurality of service endpoints, wherein the processing data for each service endpoint indicates success rate and average latency associated with successfully processing at least a portion of the plurality of received service requests, wherein the success rate indicates a rate of success for the plurality of received service requests and the average latency is an average of a latency at the each service endpoint for processing each successfully processed request, the latency extending from receipt of the corresponding request from a client device to communicating a reply to the client device indicating that the corresponding request was successfully processed;
    acquire a balancing parameter for each of the plurality of service endpoints;
    in response to receiving at least one of the service requests, calculate a selection weight for each of the plurality of service endpoints, the selection weight based on the success rate, the average latency and the balancing parameter, wherein the balancing parameter indicates an extent to which the selection weight deviates, based on the processing data, from uniform weights across the plurality of service endpoints, and thereby determines an impact of the success rate on the selection weight; and
    select one of the plurality of service endpoints to receive the at least one of the service requests according to:
    a uniform random selection in a case where a historic data length parameter is greater than a counter of a current historic length; and
    a weighted distribution based on the calculated selection weight for each of the plurality of service endpoints, in another case where the historic data length parameter is less than the counter of the current historic length.

18. The system according to claim 17, wherein calculating the selection weight is performed using a Boltzmann distribution.

19. The system according to claim 18, wherein the endpoint selection service is further operable to:
  select the one of the plurality of service endpoints based on a random weighted distribution scheme using the selection weight for each of the plurality of service endpoints.

20. The system according to claim 17, wherein the endpoint selection service is further operable to:
  store the processing data in a historic data profile for each of the plurality of service endpoints, the historic data profile comprising an endpoint identifier and a Boolean value indicating whether at least a portion of the received service requests were successfully processed.

* * * * *